(12) United States Patent
Zhao et al.

(10) Patent No.: US 7,871,961 B2
(45) Date of Patent: Jan. 18, 2011

(54) CATALYST FOR PRODUCTION OF HYDROGEN AND SYNTHESIS GAS

(75) Inventors: Shizhong Zhao, Louisville, KY (US); X.D. Hu, Louisville, KY (US); David Patrick Tolle, Louisville, KY (US); David B. Rogers, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 992 days.

(21) Appl. No.: 11/458,115

(22) Filed: Jul. 18, 2006

(65) Prior Publication Data
US 2008/0056985 A1 Mar. 6, 2008

(51) Int. Cl.
*B01J 23/00* (2006.01)
(52) U.S. Cl. .................. 505/325; 502/302; 502/303; 502/304; 502/328; 502/334; 423/651
(58) Field of Classification Search .......... 502/302, 502/303, 304, 325, 328, 334
See application file for complete search history.

(56) References Cited

U.S. PATENT DOCUMENTS

| | | | | | |
|---|---|---|---|---|---|
| 4,415,435 | A | * | 11/1983 | Lewis | 208/65 |
| 5,198,404 | A | * | 3/1993 | Arndt et al. | 502/230 |
| 5,208,200 | A | | 5/1993 | Soled | |
| 5,478,952 | A | | 12/1995 | Schwartz | |
| 5,648,582 | A | | 7/1997 | Schmidt | |
| 6,177,381 | B1 | | 1/2001 | Jensen et al. | |
| 6,280,608 | B1 | | 8/2001 | Jensen et al. | |
| 6,458,334 | B1 | | 10/2002 | Tamhankar | |
| 6,627,572 | B1 | | 9/2003 | Cai | |
| 6,858,769 | B2 | | 2/2005 | Woodle | |
| 7,214,331 | B2 | * | 5/2007 | Jiang et al. | 252/373 |
| 7,357,911 | B2 | * | 4/2008 | Ruettinger et al. | 423/655 |
| 7,396,795 | B2 | * | 7/2008 | Reyes et al. | 502/150 |
| 2004/0192792 | A1 | | 9/2004 | Espinoza et al. | |
| 2006/0083675 | A1 | | 4/2006 | Daly et al. | |

FOREIGN PATENT DOCUMENTS

| WO | 20040043584 A | 5/2004 |
|---|---|---|
| WO | 20050049486 A | 6/2005 |

OTHER PUBLICATIONS

STIC search, Mar. 10, 2010.*
Richardson, J. T. et al., "Carbon dioxide reforming with Rh and Pt-Re catalysts dispersed on ceramic foam supports", Applied Catalysts A: General, Nov. 28, 2003, pp. 69-82, vol. 255, No. 1, Elsevier Science, Amsterdam, NL.
Jothimurugesan, K. et al., "Role of Rhenium in Pt-Re-Al2o3 Reforming Catalysis—An Integrated Study" ,AICHE Journal, Dec. 1985, pp. 1997-2007, vol. 31, No. 12, XP-002487987.
Ponec, V., "Forty years in Catalysis:what have we learned?", Journal of Molecular Catalysis A;Chemical, Aug. 3, 1998, pp. 221-239, vol. 133, No. 3, Elsevier, amsterdam, NL.

* cited by examiner

*Primary Examiner*—Stanley Silverman
*Assistant Examiner*—Paul A Wartalowicz

(57) ABSTRACT

A high efficiency catalyst for use in a catalytic partial oxidation process for the production of hydrogen or syngas gas from hydrocarbons is disclosed. The catalyst comprises rhenium in combination with a second metal selected from the group of rhenium to second metal of 25:1 to 1:1. the process comprises reacting a feed containing hydrocarbons with an oxygen source at a C/O ratio of about 0.9 to 1.1 in the presence of the catalyst, and wherein the gas hourly space velocity of the feed over the catalyst ranges from about 1,000 $hr^{-1}$ to about 2,000,000 $hr^{-1}$. In the process, the catalyst is maintained as a temperature of from about 500° C. to about 1,500° C. as the feed makes contact with the catalyst.

13 Claims, 3 Drawing Sheets

CATALYST FOR PRODUCTION OF HYDROGEN AND SYNTHESIS GAS

BACKGROUND

The present development is a high efficiency catalyst for use in a catalytic partial oxidation process for the production of hydrogen or syngas gas from hydrocarbons. The catalyst comprises rhenium in combination with a second metal selected from the group consisting of platinum, iridium, ruthenium, rhodium, and palladium at an atomic ratio of rhenium to second metal of from 25:1 to 1:1. The process comprises reacting a feed containing hydrocarbons with an oxygen source at a C/O ratio of about 0.9 to about 1.1 in the presence of the catalyst, and wherein the gas hourly space velocity of the feed over the catalyst ranges from about 1,000 $hr^{-1}$ to about 2,000,000 $hr^{-1}$. In the process, the catalyst is maintained at a temperature of from about 500° C. to about 1,500° C. as the feed makes contact with the catalyst.

Large volumes of hydrogen or synthesis gas, a mixture of hydrogen and carbon monoxide, are needed for a number of important chemical reactions. One process for producing hydrogen or synthesis gas is through catalytic partial oxidation (COPx) processes. In catalytic partial oxidation processes the gaseous hydrocarbon feedstock is mixed with air, oxygen-enriched air, or oxygen, in the presence of a catalyst. The partial oxidation of methane yields a syngas mixture with a $H_2$:CO ratio of 2:1, as shown in Equation 1:

$$CH_4 + \tfrac{1}{2}O_2 \leftrightarrow CO + 2H_2 \quad (1)$$

This product ratio is especially desirable for downstream applications such as the Fischer-Tropsch Synthesis.

In a catalytic partial oxidation process, the following side-reactions may occur:

$$CH_4 + 2O_2 \leftrightarrow CO_2 + 2H_2O \quad (2)$$

$$CO + H_2O \leftrightarrow CO_2 + H_2 \quad (3)$$

The reaction shown in Equation 2 reduces the selectivity of both hydrogen and carbon monoxide. When the reaction occurs, $CO_2$ and $H_2O$ are formed. The system then favors the reaction shown in Equation 3, which alters the $H_2$CO ratio (the ratio is greater than 2:1 in the forward direction and less than 2:1 in the reverse direction). Catalysts for partial oxidation processes reported in the prior art tend to favor production of gases with a $H_2$/CO ratio of less than 2:1 because the catalyst has <100% selectivity toward Equation 1 and high reaction temperatures needed for efficient methane conversion favor the reverse reaction of Equation 3. With a high efficiency catalyst, the reactions of Equation 2 and Equation 3 can be minimized or even totally eliminated.

In catalytic partial oxidation processes, the feedstock is normally introduced to the catalyst at elevated temperature and pressure. For example, in a typical catalytic partial oxidation process, the feedstock is preheated to a temperature of about 450° C., the gas hourly space velocity of the feed over the catalyst ranges from about 1,000 $hr^{-1}$ to about 2,000,000 $hr^{-1}$, the pressure in the reactor can be up to 300 atms, and the catalyst is maintained at a temperature of from about 500° C. to about 1,500° C. as the feed makes contact with the catalyst. The reaction generally proceeds at a relatively fast rate, and shorter catalyst contact times are needed to accomplish partial oxidation of a hydrocarbon feedstock as compared to prior art steam reforming processes.

The selectivity of catalytic partial oxidation to produce carbon monoxide and hydrogen is controlled by several factors—one of the most important being the choice of catalyst composition. Typically, the best catalyst compositions include precious metals. Rhodium, for example, has been found to be effective in CPOx processes, but rhodium also tends to have a lower stability than desired for commercial applications. Rhodium loading at concentrations of from about 3 wt % to about 10 wt % has been found to reduce the catalyst deactivation rate. In addition, to achieve high selectivity to the target products, carbon monoxide and hydrogen, and to produce synthesis gas with a $H_2$/CO ratio as close to 2.0 as possible, a temperature higher than 1000° C. is general required for a rhodium catalyst.

U.S. Pat. No. 5,648,582 (issued to Schmidt, et al. on Jul. 15, 1997) teaches a CPOx process having a very short residence time (120,000 to 12,000,000 $hr^{-1}$ at atmospheric pressure) that uses a ceramic monolith supporting a metal catalyst selected from rhodium, nickel or platinum. U.S. Pat. No. 6,458,334 (issued to Tamhankar, et al on Oct. 1, 2002) teaches a CPOx process initiated at temperatures below 200° C. and having a relatively short residence time (50,000 $hr^{-1}$ to 12,000,000 $hr^{-1}$ at a pressure of 1 to 20 atmospheres) that uses a ceria monolith supporting a metal catalyst selected from nickel, cobalt, iron, platinum, palladium, iridium, rhenium, ruthenium, rhodium, osmium and combinations thereof. The difficulty with using a monolith support is that the catalyst must be engineered to fit the reactor, which is operated at an elevated temperature. Because of the difference in expansion characteristics between the monolith and the reactor, it is possible for feed to bypass the catalyst. In addition, it can be difficult to find coating materials with the stability and durability needed for high temperature processes in large-scale applications.

For the CPOX process to be of commercial interest, it is necessary that the catalyst used in the process is able to achieve a high conversion of the methane feedstock at high gas hourly space velocities (GHSV) for a long period of time, and that the selectivity of the process to the desired products, carbon monoxide and hydrogen, must be as high as possible. Moreover, the catalyst preferably should comprise metals that are readily available at reasonable costs.

SUMMARY OF THE PRESENT DEVELOPMENT

The present development is a high efficiency activated catalyst for use in a catalytic partial oxidation (CPOx) process for the production of hydrogen or syngas gas from hydrocarbons. The CPOx process comprises reacting a feed containing hydrocarbons with an oxygen source at a C/O ratio of from about 0.9 to about 1.1 in the presence of the activated catalyst, wherein the gas hourly space velocity of the feed over the catalyst ranges from about 1,000 $hr^{-1}$ to about 2,000,000 $hr^{-1}$, the catalyst is maintained at a temperature of from about 500° C. to about 1,500° C. as the feed makes contact with the catalyst, and the pressure in the reactor is maintained at from about 1 atm to about 300 atms. The preferred catalyst for use in the process consists essentially of an alumina support impregnated with rhenium and a second metal selected from the group consisting of platinum, rhodium, iridium, ruthenium and palladium, wherein the atomic ratio of rhenium to second metal is from about 25:1 to 1:1 and the second metal is dispersed and maintained as finely distributed particles of about 10 nanometers in diameter under the process conditions. Unlike the catalysts of the prior art, the present catalyst does not include iron, nickel or cobalt. During preparation of the catalyst, the catalyst must not be exposed to an oxidizing environment at a temperature higher than about 360° C. after rhenium is loaded onto the support, and the catalyst must be activated in a reducing environment at temperatures higher than 350° C. before using in a CPOx process.

BRIEF DESCRIPTION OF THE FIGURES

FIGS. 2A-2D show graphically the relative performance of a catalyst prepared according to the invention comprising about a 4:1 Re:Pt as compared to a traditional CPOx catalyst comprising about 4% Rh and to a traditional CPOx catalyst comprising about 2% Rh, with:

FIG. 2A comparing methane conversion versus time on stream;

FIG. 2B comparing hydrogen selectivity versus time on stream;

FIG. 2C comparing OC selectivity versus time on stream; and

FIG. 2D comparing $H_2/CO$ ratio versus time on stream.

DETAILED DESCRIPTION OF THE PRESENT DEVELOPMENT

Figure 1A:
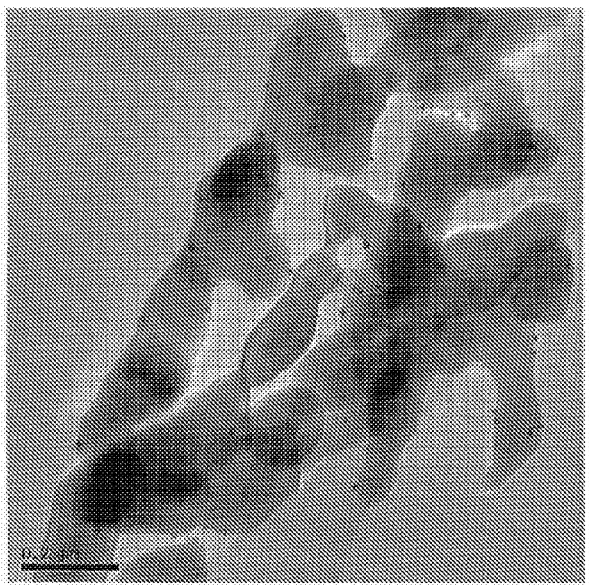
FIG. 1A is a TEM image of a freshly reduced sample of a Re—Pt catalyst made according to the invention.

The present development is a high efficiency activated catalyst for use in a catalytic partial oxidation process for the production of hydrogen or syngas gas from hydrocarbons. The present process provides high yields of hydrogen or synthesis gas.

The feed gas for the present process will typically contain light hydrocarbons ($CH_x$) and oxygen. Optionally, steam, carbon dioxide, recycle gas and combinations thereof, may be present. The molar ratio of $CH_x:O_2$ may range from about 1:1 to about 4:1. If steam and carbon dioxide are not present in the feedstock, it is desirable that the $CH_x:O_2$ ratio be about 2:1. As is known in the art, the feed ratio may be adjusted as necessary based on the availability of the feedstock and the $H_2:CO$ ratio required in any subsequent processes. Natural gas, certain refinery off gases containing methane or higher hydrocarbons, and other fuel sources that can be converted to hydrocarbon-containing gases may also be used. The oxygen source for the process is typically air, but can include air enriched with oxygen, oxygen mixed with other gases, or pure oxygen. Optionally, steam, carbon dioxide, carbon monoxide, and hydrogen may come from a recycled gas stream.

The ratio of hydrocarbon to oxygen in the feed gas may vary, with the mixture dependent on the particular hydrocarbons chosen and the amount of oxygen necessary to conduct the particular partial oxidation reaction, as is known in the art. For the production of synthesis gas from methane, it is preferred that the carbon in the hydrocarbon to oxygen ratio ($CH_x:O_2$) ranges from about 1:1 to about 4:1, and that the carbon in the hydrocarbon to steam ratio ($CH_x:H_2O$) ranges from no steam present up to about 1:5, and that the carbon in the hydrocarbon to carbon dioxide ratio ($CH_x:H_2O$) ranges from no carbon dioxide present to about 1:5.

The catalysts employed in the present invention comprise rhenium and a second metal on a refractory oxide support. The second metal is selected from the group consisting of platinum, rhodium, iridium, ruthenium and palladium. The refractory oxide is selected from the group consisting of alumina or rare earth promoted alumina or alkaline earth modified alumina, with a surface area greater than about 0.5 $m^2g$, and preferably greater than 1 $m^2g$, and more preferably greater than 2 $m^2g$. In an exemplary embodiment, the refractory oxide is a pure alumina with a surface area greater than about 0.5 $m^2g$. The refractory oxide is typically provided as particles in the shape of rings with one or more holes, tabs, granules, spheres, powders ranging in size up to about 30 micrometers, or is wash-coated onto a monolith substrate. The rhenium concentration ranges from about 0.1 wt % to about 10 wt %, preferably from about 0.5 wt % to about 5 wt %, and the second metal concentration ranges from about 0.05 wt % to about 5 wt %, preferably from about 0.1 wt % to about 2.5 wt %, with the concentrations of rhenium to second metal adjusted as necessary to maintain a rhenium to second metal atomic ratio of from about 25:1 to about 1:1. The balance of the catalyst is the support. In a preferred embodiment, the catalyst comprises rhenium and platinum with the metals present such that the Re:Pt is equal to about 4:1.

The rhenium and the second metal are impregnated on the support using a conventional incipient wetness method. The metals may be impregnated either sequentially or simultaneously. After the rhenium is added to the support, care must be taken to not expose the rhenium-impregnated support to temperatures in excess of 360° C. in an oxidizing environment. Rather, the catalyst must be thermally treated at temperatures below 360° C., and preferably at temperatures below 150, to remove any moisture and decomposition components. Before use in the CPOx process, the catalyst must be placed in a reducing environmental at relatively low temperatures, such as temperatures of less than 100° C., and activated by increasing the temperature in a hydrogen-containing gas stream until the temperature is higher than about 300° C., and preferably is as high as about 700° C. to about 1000° C. The catalyst can be pre-reduced or reduced in-situ. The precursors for the rhenium and the second metals used in this development can be nitrates, chlorides, ammonium complexes, organometallic compounds and combinations thereof.

The partial oxidation process is conducted by contacting the hydrocarbon feed gas and the oxygen source with the catalyst at predetermined contact times which will vary depending on the particular feed gases, the catalyst composition, the pressure and the space velocity employed. Under typical operating conditions, the feed gas will be introduced at a standard gas hourly space velocity (GHSV) of between 1,000 $hr^{-1}$ to about 2,00,000 $hr^{-1}$, and preferably at a GHSV of greater than about 100,000 $hr^{-1}$. The linear space velocity ranges from about 0.1 meter per second to about 300 meters per second. The pressure for the process is held at from about 1 atmosphere (atm) to about 300 atms.

The hydrocarbon feed gas and the oxygen source feed is preheated to a temperature of from about 100° C. to a temperature of about 800° C. before being fed into the reactor. The feed temperature should be high enough to allow the reaction to light-off. The catalyst, packed in a fixed bed, is preheated to a temperature of from about 100° C. to a temperature of about 800° C. As the feed passes through the catalyst bed, the temperature of the bed will vary depending on the space velocity, the feed composition, and the feed preheating temperature. However, the temperature should be regulated as necessary to maintain the catalyst bed temperature at greater than about 500° C. during the CPOx process.

To evaluate the catalysts for use in the CPOx process, a catalyst bed is prepared by loading 30×40 mesh catalyst particles into a 10 mm inside diameter tubular reactor with a two-fold dilution using similarly-size quartz particles. The catalyst bed is subjected to a nitrogen ($N_2$) purge for a predetermined time period. After the $N_2$ purge, pure $H_2$ gas is fed into the reactor at a temperature of about 18° C. to about 32° C. at a flow rate of about 100 cm³/min. The catalyst is reduced in the pure hydrogen gas stream by heating the system at a rate of 20° C./min until the temperature of the reactor reaches about 850° C. for about 1 hour. After reduction, the reactor is cooled down to a temperature of less than 100° C. with a $H_2$ gas flow. When the temperature is below 100° C., the $H_2$ gas feed stream is replaced with a methane feedstream introduced at a flow rate of about 100 cm³/min, and the methane is allowed to flow through the reactor until the $H_2$ gas is completely replaced. Oxygen ($O_2$) gas and/or steam are then introduced gradually, for example at a flow rate of about 20 cm³/min, to avoid reaching explosion limits and re-oxidizing the catalyst. The flow rates of $CH_4$ and $O_2$ are controlled by mass flow controllers. When target flow rates are achieved, the power on the furnace is turned on and the reactor system starts to heat up. During the heating process, the catalyst temperature, which is measured by a thermal-couple in a quartz thermal well that sets in the middle of the catalyst bed, will increase rapidly as the catalyst lights off. After light-off, the furnace is turned off to let the temperature stabilize. When the catalyst bed temperature stabilizes, the reactor and bed are heated to the desired temperature by adjusting the temperature setting of the furnace. After the feed gases pass through the catalyst bed, the resulting effluent first passes through an ice-bath, which is kept at about −15° C. to remove any water in the effluent and the remaining gas is analyzed by a gas chromatograph equipped with two columns, a 5 Å molecular sieve column for $H_2$, $O_2$, $N_2$, $CH_4$ and CO, and TDX-01 column for $CO_2$.

The catalyst composition and process of the present invention is exemplified in the examples set forth herein. These examples are not to be taken as limiting the present invention in any regard. For the examples, the hydrocarbon source is methane gas and the oxygen source is air. The gas hour space velocity (GHSV) is 500,000/hr. The catalyst bed temperature is varied from 700° C. to 1000° C., the $CH_4/O_2$ ratio is varied from 1.6 to 2.0, and $H_2O/CH_4$ ratio is varied from 0.0 to 2.5. The stability of each catalyst is defined as the time in hours for methane conversion or hydrogen selectivity to decrease by 1%.

EXAMPLE 1

A catalyst is prepared according to the invention using an alumina support having a surface area of about 4.7 m²/g and a pore volume of about 0.45 cc/g (referred to hereafter in the Examples as the "high surface area" alumina support), platinum is introduced in the form of tetra-ammine platinum nitrate solution and rhenium is introduced in the form of a perrhenic acid solution. Sufficient platinum is impregnated onto the support to achieve a target platinum loading of about 0.5 wt %, the platinum-impregnated support is then dried at about 150° C. for about 18 hours, and the dried platinum-impregnated support is then calcined at about 410° C. for about 2 hours. Rhenium is then impregnated on the platinum-impregnated support to achieve a target rhenium loading of about 2.0 wt %, the rhenium-impregnated support is then dried at about 150° C. for about 18 hours, and the rhenium-impregnated support is then calcined at about 410° C. for about 2 hours. The resulting catalyst comprises about 0.45 wt % Pt and about 1.93 wt % Re.

EXAMPLE 2

A catalyst is made as in Example 1 except the target platinum loading is about 0.25 wt % and the target rhenium loading is about 2.25 wt %. The resulting catalyst comprises about 0.30 wt % Pt and about 2.36 wt % Re.

EXAMPLE 3

A catalyst is made as in Example 1 except the target platinum loading is about 0.75 wt % and the target rhenium loading is about 1.75 wt %. The resulting catalyst comprises about 0.55 wt % Pt and about 1.69 wt % Re.

EXAMPLE 4

A catalyst is made as in Example 1 except the target platinum loading is about 1.0 wt % and the target rhenium loading is about 1.5 wt %. The resulting catalyst comprises about 0.76 wt % Pt and about 1.59 wt % Re.

EXAMPLE 5

A catalyst is made as in Example 4. The resulting catalyst comprises about 0.71 wt % Pt and about 1.00 wt % Re.

EXAMPLE 6

A catalyst is made as in Example 1 except the target platinum loading is about 1.5 wt % and the target rhenium loading is about 1.0 wt %. The resulting catalyst comprises about 0.99 wt % Pt and about 1.13 wt % Re.

EXAMPLE 7

A catalyst is made as in Example 6. The resulting catalyst comprises about 1.42 wt % Pt and about 0.68 wt % Re.

EXAMPLE 8

A catalyst is made as in Example 1 except the target platinum loading is about 2.0 wt % and the target rhenium loading is about 0.5 wt %. The resulting catalyst comprises about 1.13 wt % Pt and about 0.62 wt % Re.

EXAMPLE 9

A catalyst is made as in Example 1 except the target platinum loading is about 0.25 wt % and the target rhenium loading is about 1.0 wt %. The resulting catalyst comprises about 0.23 wt % Pt and about 0.90 wt % Re.

EXAMPLE 10

A catalyst is made as in Example 1 except the target platinum loading is about 0.1 wt % and the target rhenium loading is about 0.4 wt %. The resulting catalyst comprises about 0.08 wt % Pt and about 0.52 wt % Re.

EXAMPLE 11

A catalyst is made as in Example 1 except the target rhenium loading is about 2.5 wt % and no platinum is added (i.e. the target platinum loading is 0.0 wt %). The resulting catalyst comprises about 2.1 wt % Re.

EXAMPLE 12

A catalyst is made as in Example 1 except the target platinum loading is about 2.5 wt % and no rhenium is added (i.e.

the target rhenium loading is 0.0 wt %). The resulting catalyst comprises about 2.25 wt % Pt.

EXAMPLE 13

A catalyst is made as in Example 12. The resulting catalyst comprises about 1.67 wt % Pt.

EXAMPLE 14

An alumina support having a surface area of 4.7 m$^2$/g and a pore volume of 0.45 cc/g without other metals added is used as a catalyst.

EXAMPLE 15

A catalyst is prepared as in Example 1 except that the rhenium-impregnated support is not calcined at 410° C. after being dried at 150° C. The resulting catalyst comprises about 0.38 wt % Pt and about 1.75 wt % Re.

EXAMPLE 16

A catalyst is prepared as in Example 15 except that an alumina support having a surface area of 237 m$^2$/g and a pore volume of about 0.56 cc/g is used to prepare the catalyst and the rhenium-impregnated support is not calcined at 410° C. after being dried at 150° C. The resulting catalyst comprises about 0.45 wt % Pt and about 1.95 wt % Re.

EXAMPLE 17

A catalyst is prepared as in Example 1 except that an alumina support having a surface area of 237 m$^2$/g and a pore volume of about 0.56 cc/g is used to prepare the catalyst. The resulting catalyst comprises about 0.49 wt % Pt and about 1.2 wt % Re, and has a surface area of about 216 m$^2$/g.

EXAMPLE 18

A catalyst is prepared as in Example 17 except the Al$_2$O$_3$ support is calcined at about 1400° C. before loading impregnation with either Pt or Re. The resulting catalyst comprises about 0.42 wt % Pt and about 0.0 wt % Re, and has a surface area of about 2.3 m$^2$/g.

EXAMPLE 19

A catalyst is prepared as in Example 18 except the rhenium-impregnated support is not calcined at about 1400° C. after being dried at 150° C. The resulting catalyst comprises about 0.36 wt % Pt and about 0.97 wt % Re.

EXAMPLE 20

A catalyst is prepared as in Example 18 except that the rhenium precursor is ammonium perrhenate. The resulting catalyst comprises about 0.47 wt % Pt and about 1.70 wt % Re.

EXAMPLE 21

A catalyst is prepared as in Example 1 except the platinum is replaced by palladium added in the form of tetra-ammine palladium hydroxide for a target Pd loading of 0.5 wt %. The resulting catalyst comprises about 0.47 wt % Pt and about 1.70 wt % Re.

EXAMPLE 22

A catalyst is prepared as in Example 1 except the platinum is replaced by rhodium added in the form of rhodium nitrate for a target Rh loading of 0.5 wt %. The resulting catalyst comprises about 0.56 wt % Rh and about 1.33 wt % Re.

EXAMPLE 23

A catalyst is prepared as in Example 1 except the platinum is replaced by ruthenium added in the form of ruthenium nitrosyl nitrate for a target Ru loading of about 0.5 wt %. The resulting catalyst comprises about 0.46 wt % Ru and about 1.05 wt % Re.

EXAMPLE 24

A catalyst is prepared as in Example 1 except the platinum is replaced by iridium added in the form of iridium acetate for target Ir loading of 0.5 wt %. The resulting catalyst comprises about 0.41 wt % Ir and 1.01 wt % Re.

EXAMPLE 25

(comparative) An alumina support having a surface area of 4.7 m$^2$/g and a pore volume of 0.45 cc/g is impregnated with Rh(NO$_3$)$_3$ solution using incipient wetness method for a target Rh loading of 4.0 wt %. The catalyst is dried at about 150° C. after impregnation for about 18 hours and is then calcined at about 410° C. for about 2 hours.

EXAMPLE 26

(comparative) The catalyst is made exactly as described in example 25 except that the final Rh loading on the catalyst is about 2 wt %.

The catalysts of Examples 1, 5, 7, 9-10, 12, 17-18, and 21-26 are subjected to performance testing in a fixed bed reactor heated to 900° C. A feed stream comprising methane and steam and an oxygen feedstream are fed into the reactor at a GHSV=500,000/h such that the CH$_4$/O$_2$=2 and the H$_2$O/CH$_4$=0.

TABLE 1

Catalyst performance at CH$_4$/O$_2$ = 2, H$_2$O/CH$_4$ = 0, GHSV = 500,000 and 900° C.

| Catalyst | Initial $X_{CH4}$ (%) | $X_{CH4}$ Stability (h/V1%) | Initial $S_{H2}$ (%) | Final $S_{H2}$ (%) | Initial H$_2$/CO | Final H$_2$/CO | Hours on Stream | End of Run $X_{CH4}$ (%) |
|---|---|---|---|---|---|---|---|---|
| Re:Pt | | | | | | | | |
| 10 | 6.50:1 | 78.3 | 10.3 | 96.6 | 94.4 | 1.96 | — | 3.92 | 77.9 |
| 1 | 4.29:1 | 93.9 | 90.3 | 100 | 100 | 2.0 | 2.0 | 235 | 91.3 |
| 17 | 4.29:1 | 86.7 | 118 | 94.4 | 93.4 | 1.93 | 2.0 | 99.9 | 85.8 |

TABLE 1-continued

Catalyst performance at $CH_4/O_2 = 2$, $H_2O/CH_4 = 0$, GHSV = 500,000 and 900° C.

| Catalyst | Initial $X_{CH4}$ (%) | $X_{CH4}$ Stability (h/V1%) | Initial $S_{H2}$ (%) | Final $S_{H2}$ (%) | Initial $H_2/CO$ | Final $H_2/CO$ | Hours on Stream | End of Run $X_{CH4}$ (%) |
|---|---|---|---|---|---|---|---|---|
| 9 | 3.91:1 | 85.6 | 19.1 | 98.2 | 92.4 | 2.0 | 1.92 | 100.4 | 80.3 |
| 5 | 1.41:1 | 87.8 | 18.6 | 99.5 | 96.9 | 2.0 | 1.97 | 100 | 82.4 |
| 7 | 0.48:1 | 82.6 | 10.4 | 99.2 | 89.2 | 2.0 | 1.82 | 100 | 73.0 |
| 18 | 0.0:1 | 76.8 | 1.2 | 82.9 | 81.8 | 1.72 | 1.69 | 4.5 | 73.1 |
| 12 | no Re Re:M | 92.7 | 1.0 | 100 | 96.5 | 2.0 | 1.98 | 7.4 | 85.3 |
| 21 (Pd) | 1.88:1 | 73.5 | 0.46 | 85.9 | 71.6 | 1.8 | 1.5 | 5.05 | 62.5 |
| 22 (Rh) | 2.38:1 | 88.8 | 19.0 | 94.4 | 90.5 | 1.93 | 1.86 | 100.1 | 83.5 |
| 23 (Ru) | 2.28:1 | 82.3 | 65.8 | 90.5 | 89.5 | 1.86 | 1.85 | 47.1 | 81.6 |
| 24 (Ir) | 2.46:1 wt % Rh | 81.7 | 48.4 | 96.3 | 88.1 | 1.96 | 1.83 | 100.2 | 79.6 |
| 25 (Rh) | 4 | 92.9 | 4.2 | 92.4 | 87.3 | 1.87 | 1.78 | 46.4 | 81.8 |
| 26 (Rh) | 2 | 93.5 | 4.6 | 94.6 | 79.3 | 1.91 | 1.63 | 119.6 | 67.5 |

The catalysts of Examples 2-4, 6, 8, 11, 13 and 14 are subjected to performance testing in a fixed bed reactor with the temperature adjusted between 700° C. and 1000° C. and then back to 700° C. using a 100° C. step function wherein sufficient time is provided between temperatures changes to allow the reactor temperature to stabilize (as determined by collection of at least three data points). The initial catalyst activity expressed as percent methane conversion is measured at each 100° C. interval.

TABLE 2

Initial catalyst activity at 700° C. to 1000° C.

| Sample | Pt wt % | Re wt % | Re:Pt | 700° C. | 800° C. | 900° C. | 1000° C. | 900° C. | 800° C. | 700° C. |
|---|---|---|---|---|---|---|---|---|---|---|
| 14 | 0 | 0 | no Re, Pt | 0.0 | 0.0 | 2.1 | 18.2 | 2.6 | 0.1 | 0 |
| 13 | 1.67 | 0 | no Re | 72.2 | 75.9 | 80.4 | 81.9 | 78.5 | 72 | 65 |
| 11 | 0.0 | 2.1 | no Pt | 0.15 | 3.25 | 6.5 | 32.5 | 5.3 | 2.0 | 0 |
| 2 | 0.25 | 2.25 | 7.87:1 | 66.8 | 72.2 | 79.1 | 86.0 | 80.5 | na | na |
| 3 | 0.55 | 1.69 | 3.07:1 | 73.9 | 79.1 | 84.4 | 88.8 | 85.1 | 79.7 | 72.6 |
| 4 | 0.76 | 1.59 | 2.09:1 | 76.6 | 81.4 | 86.4 | 89.8 | 87.4 | 82.9 | 75.2 |
| 6 | 0.99 | 1.13 | 1.14:1 | 76.5 | 80.8 | 85.7 | 89.1 | 86.1 | 81.2 | 75.5 |
| 8 | 1.13 | 0.62 | 0.55:1 | 72.3 | 77.0 | 82.0 | 87.1 | 83.1 | 77.4 | 71.7 |
| 15 | 0.38 | 1.75 | 4.53:1 | 78.4 | 82.6 | 86.8 | 89.4 | 87.3 | 83.4 | 78.8 |

It has been observed that when using a rhenium-comprising catalyst for the catalytic partial oxidization process, and particularly when the rhenium is used in combination with platinum, the catalyst is better able to maintain the conversion of methane to hydrogen and carbon monoxide at relatively high conversion rates for a substantially longer time on stream than is observed with conventional rhodium catalysts.

Figure 1B:
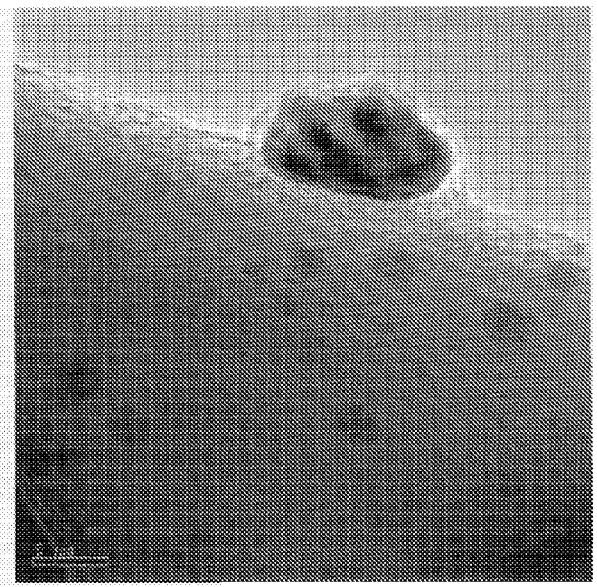
FIG. 1B is a TEM image of the catalyst of FIG. 1A at a higher magnification.
Figure 1C:
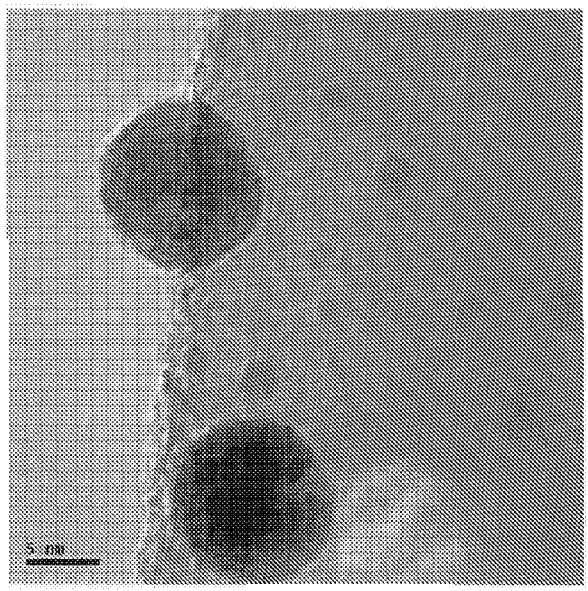
FIG. 1C is a TEM image of the catalyst of FIG. 1B after being subjected to a methane and steam feedstream and an oxygen feedstream wherein the $CH_4/O_2=2$ and the $H_2O/CH_4=0$ for about 235 hours, and the reactor is heated to a temperature of about 900° C.

FIG. 1A is a TEM image of the Re—Pt catalyst of Example 1 as prepared and reduced. FIG. 1B is a TEM image of the same catalyst at a higher magnification. FIG. 1C is a TEM image of the same catalyst after being subjected to CPOx conditions in the presence of a methane and steam feedstream and an oxygen feedstream wherein the $CH_4/O_2=2$ and the $H_2O/CH_4=0$ for about 235 hours at 900° C. As shown in FIGS. 1A-1C, the catalyst maintains its integrity even after about 235 hours on-stream at 900° C.

Figure 2A:
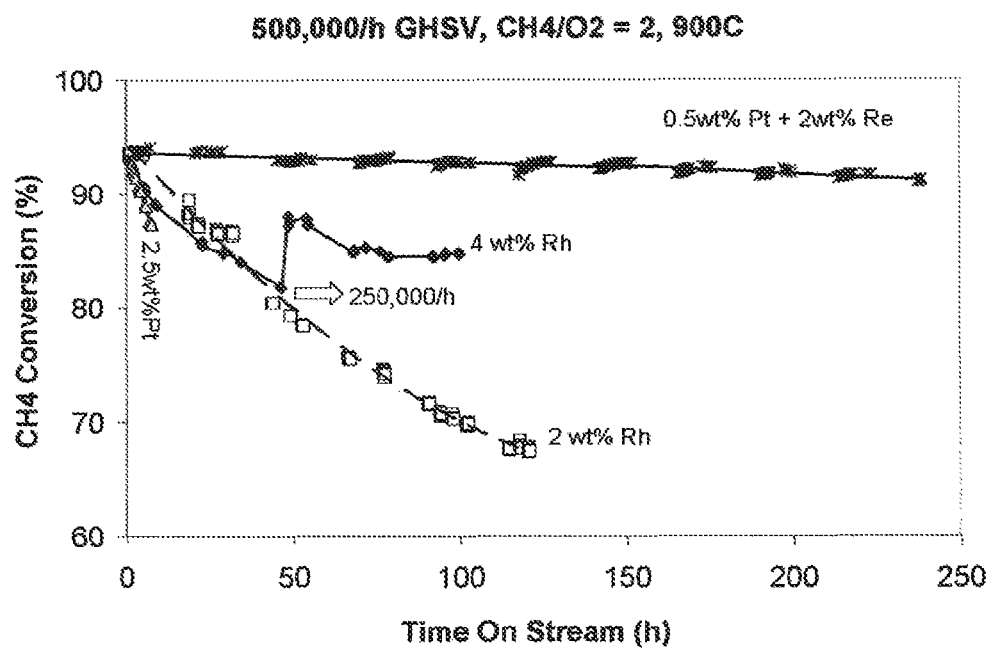
Figure 2B:
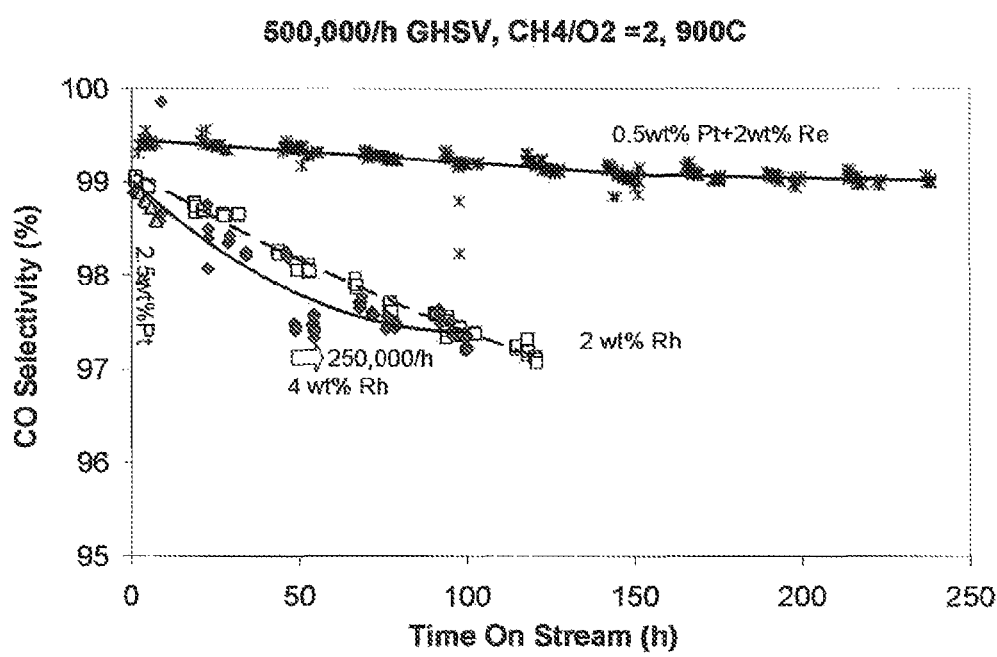
Figure 2C:
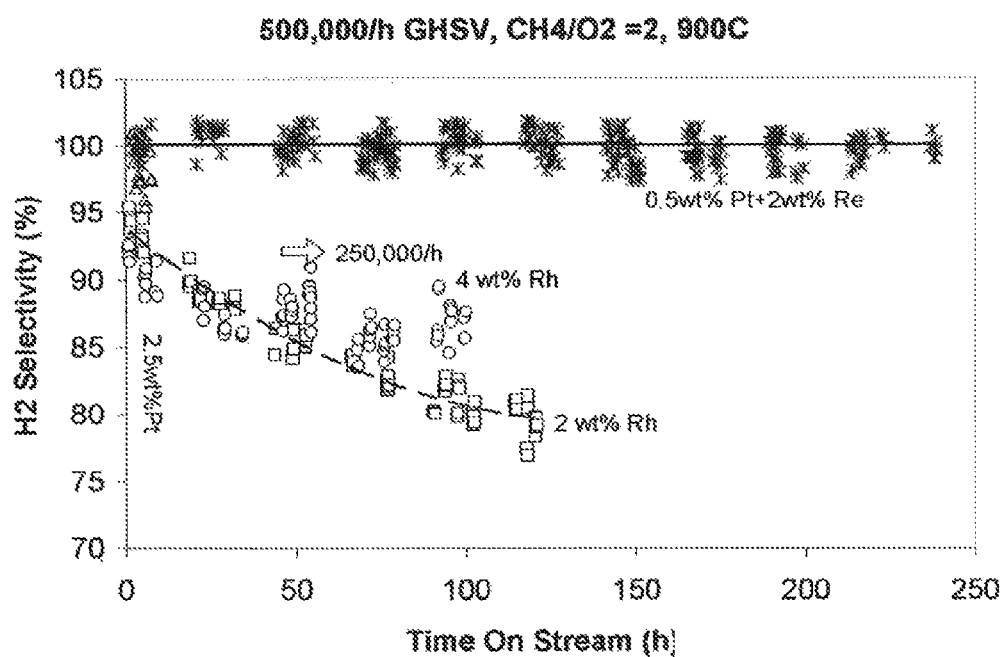
Figure 2D:
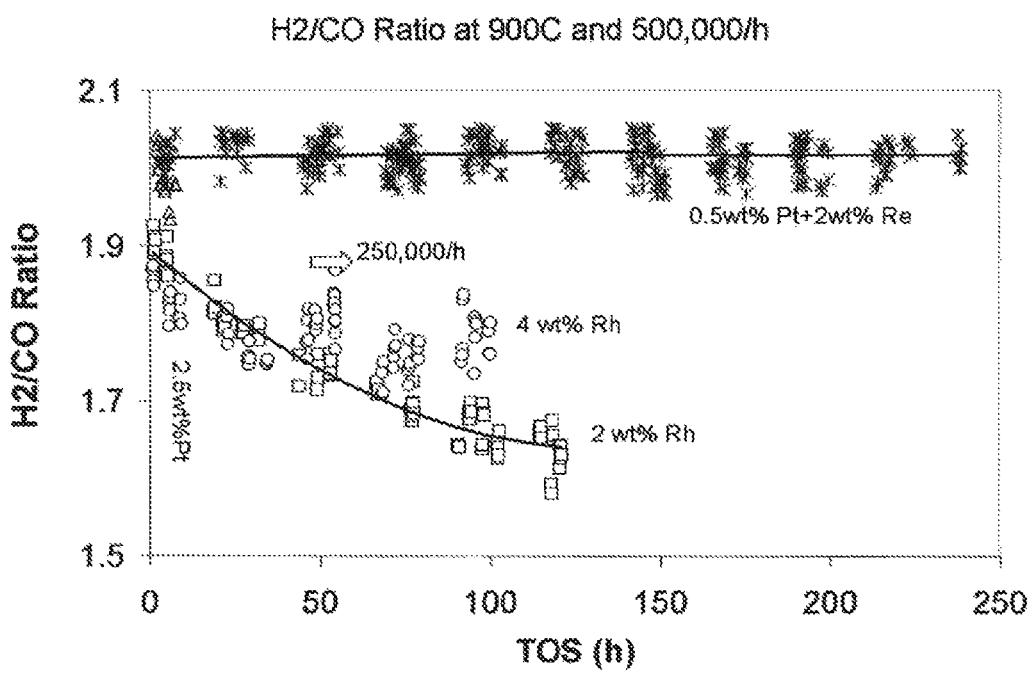

FIGS. 2A-2D demonstrate graphically the relative performance of the Re—Pt catalyst of Example 1 with the traditional rhodium catalysts of Examples 25 and 26. As shown in FIG. 2A, the inventive Re—Pt catalyst demonstrates a higher level of methane conversion for a longer period of time. The Re—Pt catalyst is also more selective with respect to hydrogen and carbon monoxide than are the rhodium catalysts, as shown in FIGS. 2B and 2C. The Re—Pt catalyst is also better able to maintain the desired $H_2/CO$ ratio of about 2.0 for a longer period on stream than can the traditional rhodium catalysts, as demonstrated in FIG. 2D.

It is understood that variations may be made to the process described herein which would fall within the scope of this development, for example, using the catalyst in a syngas generation process with the addition of $CO_2$ in the feed stream or the recycle of effluents from the down stream processes.

What is claimed is:

1. A catalytic partial oxidation process for the production of hydrogen or syngas from hydrocarbons, wherein said process comprises contacting a hydrocarbon feed gas and an oxygen source with a catalyst for a predetermined contact time, wherein said catalyst consists essentially of rhenium, platinum and a refractory oxide support and a rhenium to platinum atomic ratio is about 4:1, wherein the support has a surface area of about 0.5 m$^2$/g to about 4.7 m$^2$/g, wherein the rhenium and platinum are in direct contact with the refractory oxide support, said refractory oxide support is selected from the group consisting of alumina, rare earth promoted alumina, and alkaline earth modified alumina, wherein said catalyst is packed in a fixed bed and is-preheated to a temperature of from about 100° C. to a temperature of about 800° C. and wherein said feed gas is preheated to temperature of from about 100° C. to a temperature of about 800° C. and is then introduced into the reactor at a standard gas hourly space velocity (GHSV) of between about 1,000 hr$^{-1}$ and about 2,000,000 hr$^{-1}$ and while maintaining a pressure of about 1 atmosphere to about 300 atmospheres.

2. The process of claim 1 wherein said hydrocarbon feed gas comprises light hydrocarbons light hydrocarbons and the hydrocarbons and the oxygen define a molar ratio and the molar ratio of $CH_x:O_2$ is from about 1:1 to about 4:1.

3. The process of claim 1 wherein said catalyst comprises rhenium at a concentration of from about 0.5 wt % to about 5 wt % and platinum at a concentration of about 0.1 wt % to about 2.5 wt %.

4. An activated catalyst for use in a catalytic partial oxidation process for the production of hydrogen or syngas gas from hydrocarbons, the catalyst consisting essentially of rhenium, platinum and a refractory oxide support, wherein
- a rhenium to platinum atomic ratio is about 4:1,
- the refractory oxide support is selected from the group consisting of alumina, rare earth promoted alumina and alkaline earth modified alumina, and
- the refractory oxide support has a surface area of about 0.5 m$^2$/g to about 4.7 m$^2$/g,
- the rhenium and platinum are in direct contact with the refractory oxide support, and
- the activated catalyst is used in a catalytic partial oxidation process for the production of hydrogen or syngas gas from hydrocarbons.

5. The catalyst of claim 4 wherein the rhenium is present at a concentration of about 0.1 wt % to about 10 wt %, wherein the wt % is based on the total weight of rhenium, platinum and the support.

6. The catalyst of claim 4 wherein the rhenium is present at a concentration of about 0.5 wt % to about 5 wt %.

7. The catalyst of claim 4 wherein the platinum is present at a concentration of about 0.05 wt % to about 5 wt %.

8. The catalyst of claim 4 wherein the platinum is present at a concentration of about 0.1 wt % to about 2.5 wt %.

9. The catalyst of claim 4 wherein the support is pure alumina.

10. The catalyst of claim 4 wherein the catalyst is prepared by impregnating the rhenium and platinum on the support to form a metal-impregnated support, thermally treating the metal-impregnated support at a temperature of less than 360° C., exposing the thermally-treated, metal-impregnated support to a reducing environment at a temperature of less than 100° C., and activating the thermally-treated, metal impregnated support by exposure to a hydrogen-containing gas stream at a temperature of at least 300° C.

11. The catalyst of claim 10 wherein the rhenium and platinum are impregnated on the support using an incipient wetness method.

12. The catalyst of claim 10 wherein the support is thermally treated at a temperature of less than 150 ° C.

13. The catalyst of claim 4 wherein the platinum is dispersed on the support as particles of about 10 nanometers in diameter.

* * * * *